United States Patent [19]
Lewis et al.

[11] Patent Number: 6,138,504
[45] Date of Patent: Oct. 31, 2000

[54] AIR/FUEL RATIO CONTROL SYSTEM

[75] Inventors: Donald J. Lewis, Brighton; John David Russell, Farmington Hills; Allan Joseph Kotwicki, Williamsburg; Ross Dykstra Pursifull, Dearborn, all of Mich.

[73] Assignee: Ford Global Technologies, Inc., Dearborn, Mich.

[21] Appl. No.: 09/090,125

[22] Filed: Jun. 4, 1998

[51] Int. Cl.⁷ .................................................. G01M 15/00
[52] U.S. Cl. ............................................................ 73/118.2
[58] Field of Search ................................. 73/116, 117.2, 73/117.3, 118.1, 118.2

[56] References Cited

U.S. PATENT DOCUMENTS

| | | | |
|---|---|---|---|
| 4,555,952 | 12/1985 | Jenkins | 73/861.47 |
| 5,273,019 | 12/1993 | Matthews et al. | |
| 5,390,649 | 2/1995 | Miener et al. | |
| 5,474,051 | 12/1995 | Matsumoto et al. | 73/118.1 |
| 5,497,329 | 3/1996 | Tang . | |
| 5,508,926 | 4/1996 | Wade . | |
| 5,520,161 | 5/1996 | Klopp . | |
| 5,537,977 | 7/1996 | Hartman et al. | |
| 5,577,484 | 11/1996 | Izutani et al. | 73/117.3 |
| 5,613,479 | 3/1997 | Gates et al. | 73/861.61 |
| 5,964,820 | 10/1999 | Miwa et al. | 73/117.3 |

FOREIGN PATENT DOCUMENTS 2312284   10/1997   United Kingdom .

*Primary Examiner*—Eric S. McCall
*Attorney, Agent, or Firm*—John D. Russell

[57] ABSTRACT

A method for controlling the air/fuel ratio of an internal combustion engine uses a manifold pressure sensor and an exhaust gas recirculation system having an orifice and a exhaust pressure sensor located upstream of the orifice. Both the manifold pressure sensor and the exhaust pressure sensor are sampled synchronously with a frequency proportional to the firing frequency of the engine and then filtered to eliminate unwanted frequencies. The sampled signals obtained then have the necessary bandwidth needed for closed loop control of the exhaust gas recirculation flow and engine air/fuel ratio control.

15 Claims, 5 Drawing Sheets

AIR/FUEL RATIO CONTROL SYSTEM

FIELD OF THE INVENTION

The present invention relates to an air/fuel ratio control system for an internal combustion engine where air flow and exhaust gas recirculation flow are calculated from pressure sensors.

BACKGROUND OF THE INVENTION

Engine control systems often determine the amount of fuel to inject by measuring a manifold pressure, along with other engine operating conditions. This method is often referred to by those skilled in the art as the speed density method. In this method, a mean value model of engine operation is constructed, where an average manifold pressure at a given speed results in a certain air flow into the cylinder. In this type of system, measurement of the manifold pressure is critical for proper prediction of the air flow into the cylinder and thus for proper air/fuel ratio control.

One approach for calculating a value of the manifold pressure to use in the speed density approach is to sample the manifold pressure sensor when the piston is at top dead center, bottom dead center, and two other points equally spaced from dead center positions. For example, the two other equally spaced samples could be 60 degrees after dead center. Thus, four samples per revolution of the crankshaft are used that are not necessarily equally spaced. Then, an average of the last two and the current value of the manifold pressure is taken to obtain the averaged value of the manifold pressure used in the speed density method. Such a system is disclosed in U.S. Pat. No. 5,497,329.

The inventors herein have recognized numerous disadvantages with the above approach. For example, the sampling scheme described above will produce a constant bias unless the two equally spaced samples occur in the proper location. In particular, the resulting averaged manifold pressure will be consistently offset from the true average. This results in an error in the prediction of air flow at a steady state operating condition. Another disadvantage, for example, is that the resulting averaged manifold pressure will still contain oscillations that will cause cyclic errors in prediction of air flow at a steady state operating condition. These cyclic errors may cause reduced efficiency in controlling regulated emissions.

Also, engine control systems relying on a manifold pressure sensor to determine fresh charge entering the engine must be able to measure flow of exhaust gas recirculation to accurately control the exhaust air/fuel ratio. Previous systems have used a differential pressure measurement across an orifice to infer a flow of exhaust gas. Traditionally, the orifice is located upstream of the exhaust gas recirculation flow control valve. Thus, the pressure measurements are shielded from the intake manifold pressure pulsations; however, the pressure measurements are not shielded from the exhaust pressure pulsations. In the traditional system, the high frequency pressure pulsations present in the pressure measurements are reduced by using a conventional low pass filter. Such a system is disclosed in U.S. Pat. No. 5,613,479.

The inventors herein have recognized a significant opportunity to reduce total system cost by relocating the orifice-downstream of the exhaust gas recirculation flow control valve but before the intake manifold. Thus, the manifold pressure sensor can be used to measure the pressure downstream of the orifice and a single absolute pressure sensor can be used to measure the pressure upstream of the orifice. This creates the needed differential pressure to measure exhaust gas recirculation flow.

The inventors herein have recognized numerous disadvantages with the above approach. For example, the manifold pressure sensor is sensitive to pressure fluctuations in the manifold and the upstream exhaust pressure sensor is sensitive to pressure fluctuations in the exhaust pressure. Since these fluctuations are out of phase with one another, a significant error is created in the difference between the two. Another disadvantage is the need for a conventional low pass filter to reduce these oscillations, where the conventional low pass filter is known to hinder transient performance.

SUMMARY OF THE INVENTION

An object of the invention claimed herein is to provide a method to more accurately calculate the fresh air entering a cylinder of an engine.

The above object is achieved, and disadvantages of prior approaches overcome, by a method for calculating air flow in an internal combustion engine. The method comprises sensing an engine speed of the engine, synchronously sampling a first pressure sensor with a frequency proportional to a firing frequency of the engine, filtering said synchronously sampled first pressure with a filter to remove oscillations at frequencies proportional to said firing frequency, and calculating a mass of gas entering a cylinder of the engine responsive to said first filtered pressure and said engine speed.

By sampling the pressure waveform synchronously at a rate proportional to the firing frequency of the engine and sampling with the proper proportion, the pressure pulsations caused by the firing orders of the engine can be removed. This leaves the proper value of pressure, which represents the mean value, for calculating air flow entering the cylinder. Thus, by properly selecting the location of sample points occurring at a frequency proportional to the firing frequency of the engine, the inventors have obtained an unexpected benefit that not only eliminates all fluctuations in the filtered pressure, but also removes any constant bias.

In another aspect of the present invention both upstream and downstream pressures are sensed by sampling both the pressure waveforms synchronously at a rate proportional to the firing frequency of the engine and sampling with the proper proportion. Thus, the pressure pulsations caused by the firing orders of the engine can be removed. This leaves the proper constant value of differential pressure, which represents the average value, for calculating exhaust gas recirculation flow entering the manifold.

An advantage of the above aspect of the invention is that the response to transients in the mean pressure value is greatly improved.

Another advantage of the above aspect of the invention is improved emission control.

Another advantage of the above aspect of the invention is that the accuracy of the air charge calculation is increased.

Still another advantage of the above aspect of the invention is decreased system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein:

FIGS. 5–6 are examples of a fluctuating waveform on which the invention is used to.

BRIEF DESCRIPTION OF THE PREFERRED EMBODIMENT

Figure 1:
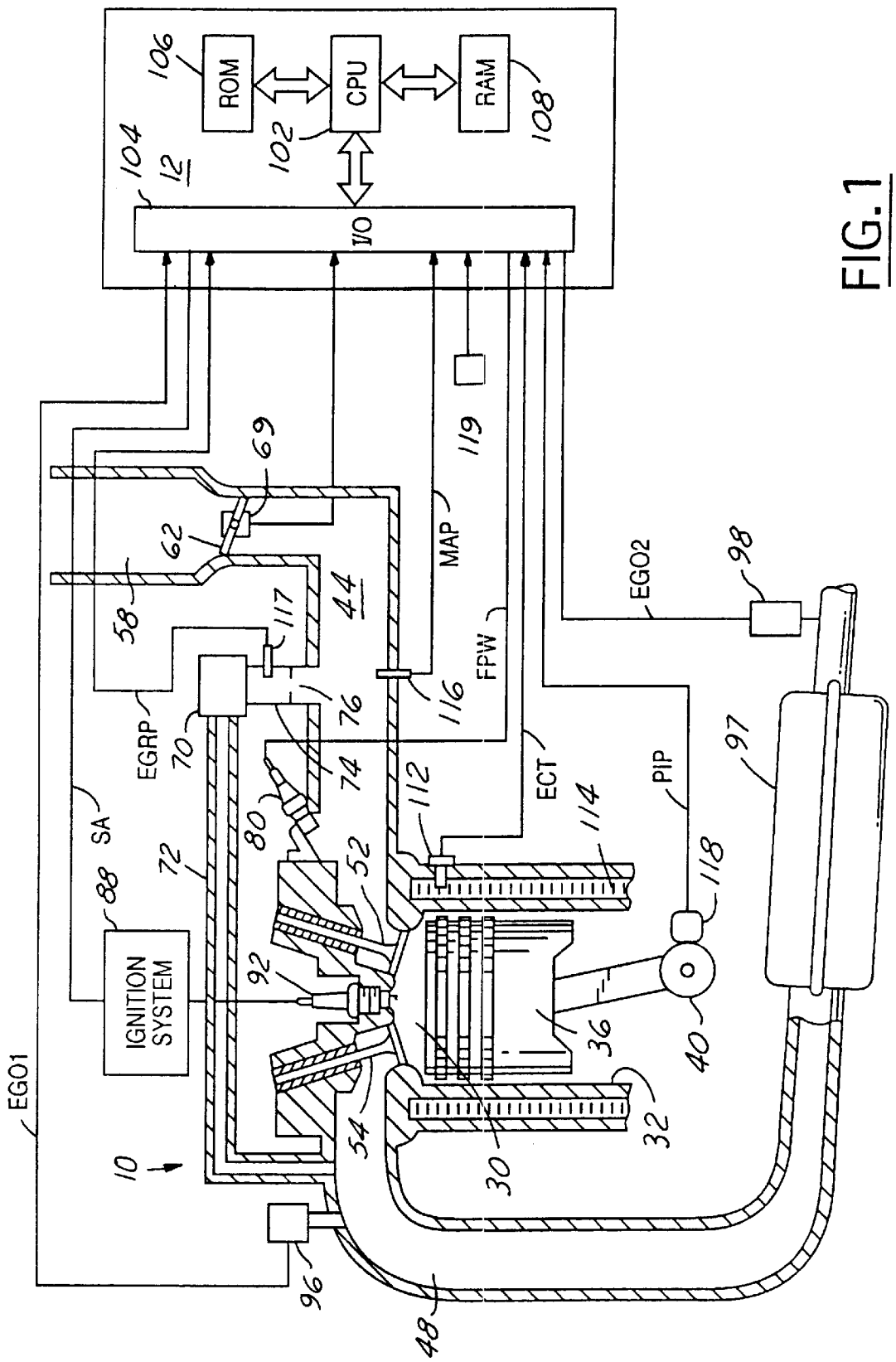
FIG. 1 is a block diagram of an engine in which the invention is used.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Throttle position sensor 69 measures position of throttle plate 62. Exhaust manifold 48 is shown coupled to exhaust gas recirculation valve 70 via exhaust gas recirculation tube 72. Exhaust gas recirculation valve 70 is also coupled to intake manifold 44 via orifice tube 74. Orifice tube 74 has orifice 76 for restricting flow therein. Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Conventional distributorless ignition system 88 provides ignition spark to combustion chamber 30 via spark plug 92 in response to controller 12. Two-state exhaust gas oxygen sensor 96 is shown coupled to exhaust manifold 48 upstream of catalytic converter 97. Two-state exhaust gas oxygen sensor 98 is shown coupled to exhaust manifold 48 downstream of catalytic converter 97. Sensor 96 provides signal EGO1 to controller 12 which converts signal EGO1 into two-state signal EGO1S. A high voltage state of signal EGO1S indicates exhaust gases are rich of a reference air/fuel ratio and a low voltage state of converted signal EGO1 indicates exhaust gases are lean of the reference air/fuel ratio. Sensor 98 provides signal EGO2 to controller 12 which converts signal EGO2 into two-state signal EGO2S. A high voltage state of signal EGO2S indicates exhaust gases are rich of a reference air/fuel ratio and a low voltage state of converted signal EGO2S indicates exhaust gases are lean of the reference air/fuel ratio.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from manifold pressure sensor 116 coupled to intake manifold 44; a measurement of exhaust gas recirculation pressure (EGRP) from exhaust pressure sensor 117 coupled to orifice tube 74 upstream of orifice 76, a profile ignition pickup signal (PIP) from Hall effect sensor 118 coupled to crankshaft 40, and an engine speed signal (RPM) from engine speed sensor 119. In a preferred aspect of the present invention, engine speed sensor 119 produces a predetermined number of equally spaced pulses every revolution of the crankshaft.

Figure 2:
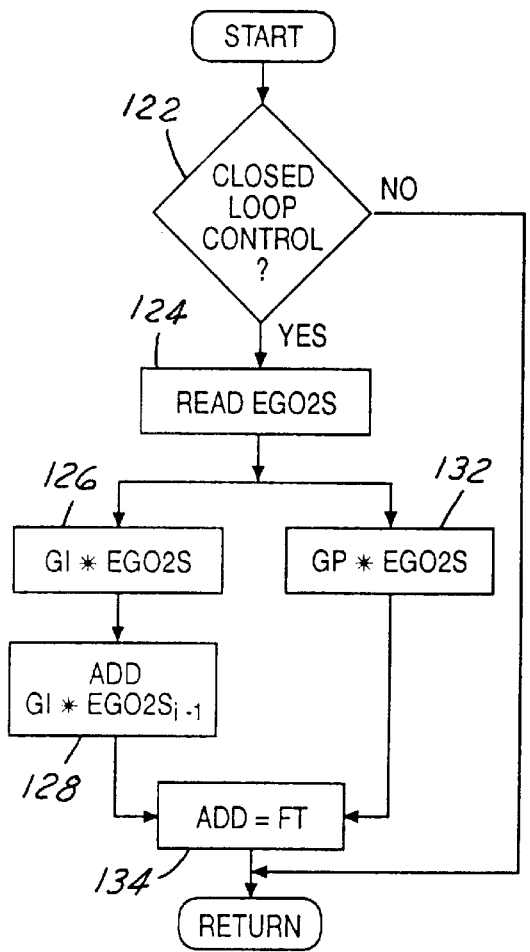
FIGS. 2–4 are high level flowcharts of various operations performed by a portion of the embodiment shown in FIG. 1.

Referring now to FIG. 2, a flowchart of a routine performed by controller 12 to generate fuel trim signal FT is now described. A determination is first made whether closed-loop air/fuel control is to be commenced (step 122) by monitoring engine operation conditions such as temperature. When closed-loop control commences, signal EGO2S is read from sensor 98 (step 124) and subsequently processed in a proportional plus integral controller as described below.

Referring first to step 126, signal EGO2S is multiplied by gain constant GI and the resulting product added to products previously accumulated ($GI*EGO2S_{i-1}$) in step 128. Stated another way, signal EGO2S is integrated each sample period (i) in steps determined by gain constant GI. During step 132, signal EGO2S is also multiplied by proportional gain GP. The integral value from step 128 is added to the proportional value from step 132 during addition step 134 to generate fuel trim signal FT.

Figure 3:
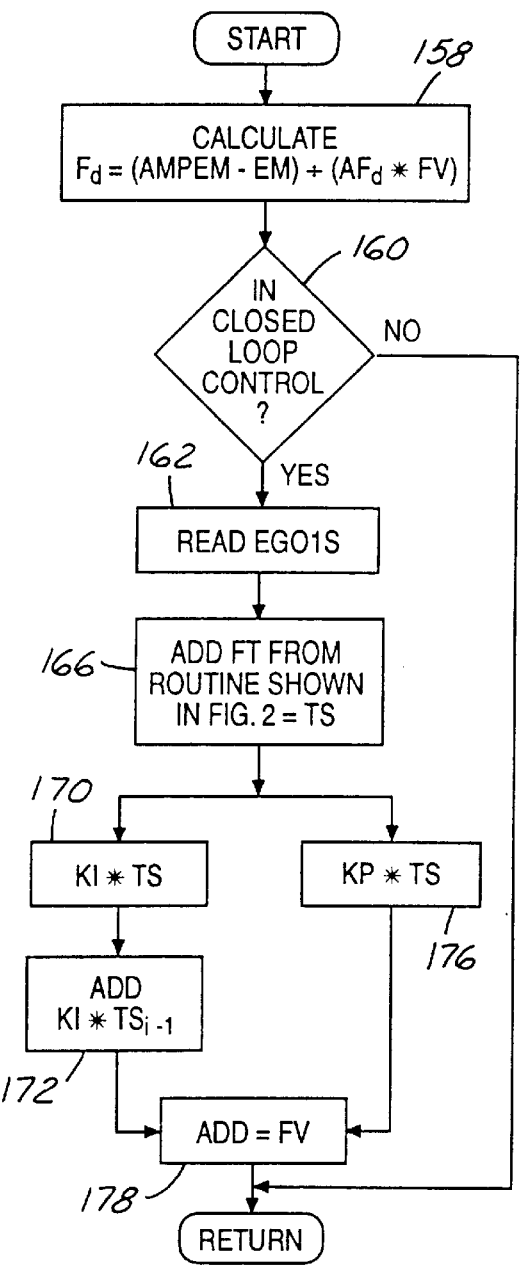

The routine executed by controller 12 to generate the desired quantity of liquid fuel delivered to engine 10 and trimming this desired fuel quantity by a feedback variable related both to sensor 98 and fuel trim signal FT is now described with reference to FIG. 3. During step 158, an open-loop fuel quantity is first determined by dividing the difference between inducted mass air flow (AMPEM, created from the signal FMAP and RPM as described later herein with particular reference to FIG. 4), which includes both fresh charge and exhaust gas recirculation, and exhaust gas recirculation estimate (EM), which is described later herein with particular reference to FIG. 4, by desired air/fuel ratio AFd which is typically the stoichiometric value for gasoline combustion. However, setting AFd to a rich value will result in operating the engine in a rich state. Similarly, setting AFd to a lean value will result in operating the engine in a lean state. Also, signal AMPEM is constructed from FMAP and RPM in the common speed density method known to those skilled in the art and can be easily empirically determined. This open-loop fuel quantity is then adjusted, in this example divided, by feedback variable FV.

After determination that closed-loop control is desired (step 160) by monitoring engine operating conditions such as temperature (ECT), signal EGO1S is read during step 162. During step 166, fuel trim signal FT is transferred from the routine previously described with reference to FIG. 2 and added to signal EGO1S to generate trim signal TS.

During steps 170, 172, 176, and 178, a proportional plus integral feedback routine is executed with trimmed signal TS as the input. Trim signal TS is first multiplied by integral gain value KI (step 170), and the resulting product added to the previously accumulated products (step 172). That is, trim signal TS is integrated in steps determined by gain constant KI each sample period (i) during step 172. A product of proportional gain KP times trimmed signal TS (step 176) is then added to the integration of KI*TS during step 178 to generate feedback variable FV.

Figure 4:
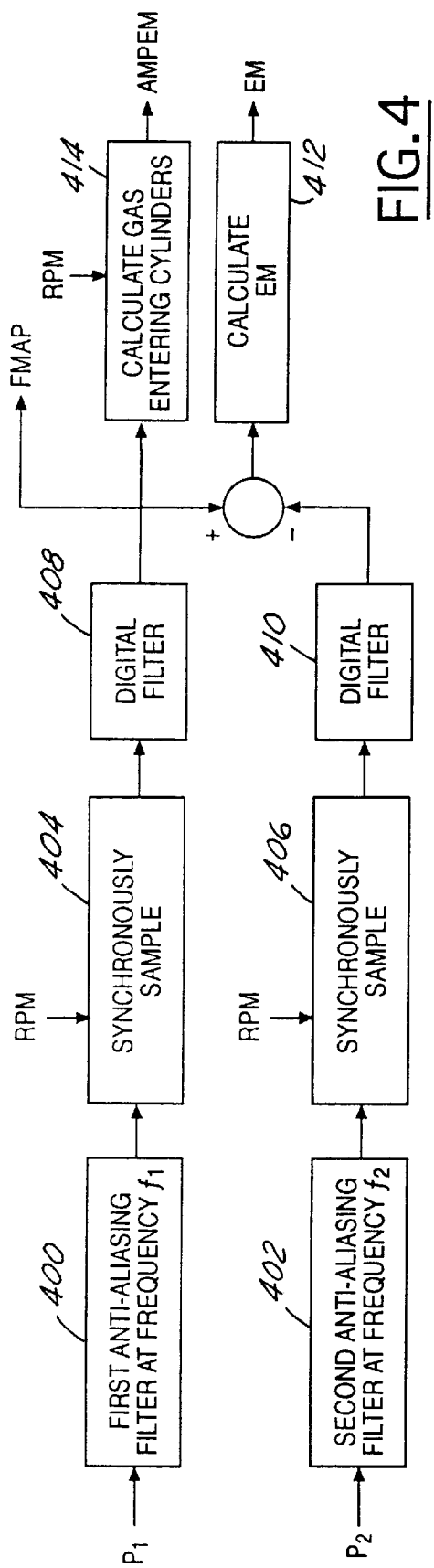

Calculating exhaust gas recirculation estimate (EM) is now described with particular reference to the diagram shown in FIG. 4. In particular, FIG. 4 shows how the upstream pressure (p1), which is signal EGRP in this example, and downstream pressure (p2), signal MAP in this example, are processed to form the signal EM. First, in block 400, upstream pressure p1 is processed through a first filter known to those skilled in the art as an anti-aliasing filter with a cut-off frequency equal to f1. Similarly, in block 402, downstream pressure p2 is processed through a second anti-aliasing filter with a cut-off frequency equal to f2. In some applications, it is unnecessary to use either the first or the second anti-aliasing filter because the geometry of the exhaust gas recirculation creates a mechanical filter that removes the unwanted high frequencies. Further frequencies f1 and f2 are set considerably higher than the necessary control bandwidth.

Next, in block 404, the result of block 400 is synchronously sampled with an engine rotation signal, such as, for example, RPM, such that the sampling is at a rate proportional to the firing frequency of the engine. For example the sampling rate could be twice the firing frequency of the engine. The proportion is generally chosen such that the sampling is at a rate of twice the highest harmonic frequency that contains significant energy. Also, as would be obvious to one of ordinary skill in the art and suggested by this disclosure, any multiple of firing frequency greater than that determined above could be used. If, for example, the exhaust gas recirculation and engine geometry are such that higher order harmonics are present in the upstream pressure signal p1, such as, for example, harmonics of twice or four times the firing frequency, a sampling rate of four or eight times the firing frequency may be necessary. Similarly, in block 406, the result of block 402 is synchronously sampled with engine speed signal RPM, such that the sampling is at a rate proportional to the firing frequency of the engine. Additionally, it is not necessary that the sampling rate be equal in blocks 404 and 406. For example, block 404 could synchronously sample at twice the firing frequency of the engine and block 406 could sample at eight times the firing frequency of the engine.

Alternatively, as is obvious to one of ordinary skill in the art and suggested by this disclosure, the pressure signal could be sampled at a frequency substantially proportional to the dominant frequency contained in the signal. This dominant frequency is usually equal to firing frequency. Thus, sampling at a rate proportional this dominant frequency could be accomplished using a circuit known to those skilled in the art as a phase-locked loop. However, because the phase locked loop sheme is sometimes searching for the dominant frequency during transients, this process may be suspended based on a change of position in throttle plate 62. During the transition, an open loop estimate of how the change in throttle plate 62 affects exhaust gas recirculation and manifold pressure must be obtained. This can be done using a predetermined map obtained through testing or analytical procedures and is known to those skilled in the art, where the transient behavior is estimated based on change of position in throttle plate 62 and other operating conditions, such as for example engine speed.

Next, digital filters in blocks 408 and 410 process the results of blocks 404 and 406. The digital filters, represented by G(z) or G'(z) used in blocks 408 and 410 are known to those skilled in the art as digital notch filters. In this application, each notch filter removes the firing frequency (and higher harmonics if necessary) of the engine. The equation below represents an example of a notch filter in the discreet domain for sampling at a rate of twice the firing frequency. Use of notch filter G(z) is also described later herein with particular reference to FIG. 5.

$$G(z)=(1+z^{-1})/2$$

If the sampling were done at a rate of eight times the firing frequency, then the following notch filter would be used as described by G'(z). Again, while this removes unwanted frequencies, transient performance is not hindered. Use of a notch filter such as G'(z) is described later herein with particular reference to FIGS. 6 and 7.

$$G'(z)=(1+z^{-1}+z^{-2}+z^{-3}+z^{-4}+z^{-5}+z^{-6}+z^{-7})/8$$

The digital filter may be different between blocks 408 and 410 and different than that shown above if necessary, such as if, for example, the geometry of the exhaust gas recirculation system was such that the certain frequencies were excessively amplified due to resonances. Also, the filter may be different between blocks 408 and 410 if block 404 synchronously sampled at twice the firing frequency of the engine and block 406 sampled at eight times the firing frequency of the engine.

The pressure difference is then created by subtracting the output of block 410, which is filtered manifold pressure FMAP, from the output from block 408. This pressure difference is then used in block 412 to create signal EM through a predetermined map or equation between pressure difference and exhaust gas recirculation flow, and, if necessary, engine operating conditions. For example, exhaust gas temperature may be used to adjust the calculation of exhaust gas recirculation flow.

Also, in block 414, signals FMAP and RPM are used to calculate the mass of gas flow entering the cylinder (AMPEM). The common speed density equations known to those skilled in the art are used to convert the filtered manifold absolute pressure with the engine speed to the total mass of gas (exhaust gas and fresh air charge) entering the cylinder. If necessary, these basic equations can be modified by engine operating conditions, such as for example gas temperature, or any other condition known to those skilled in the art and suggested by this disclosure.

Thus, an estimate of the exhaust gas recirculation and fresh air entering the cylinder is obtained that is substantially free of unwanted frequencies yet retains a bandwidth that is much greater than would be obtained with conventional filtering methods. Thus, the estimate can more accurately track transient operation and yield more accurate air/fuel ratio control.

Figure 5:
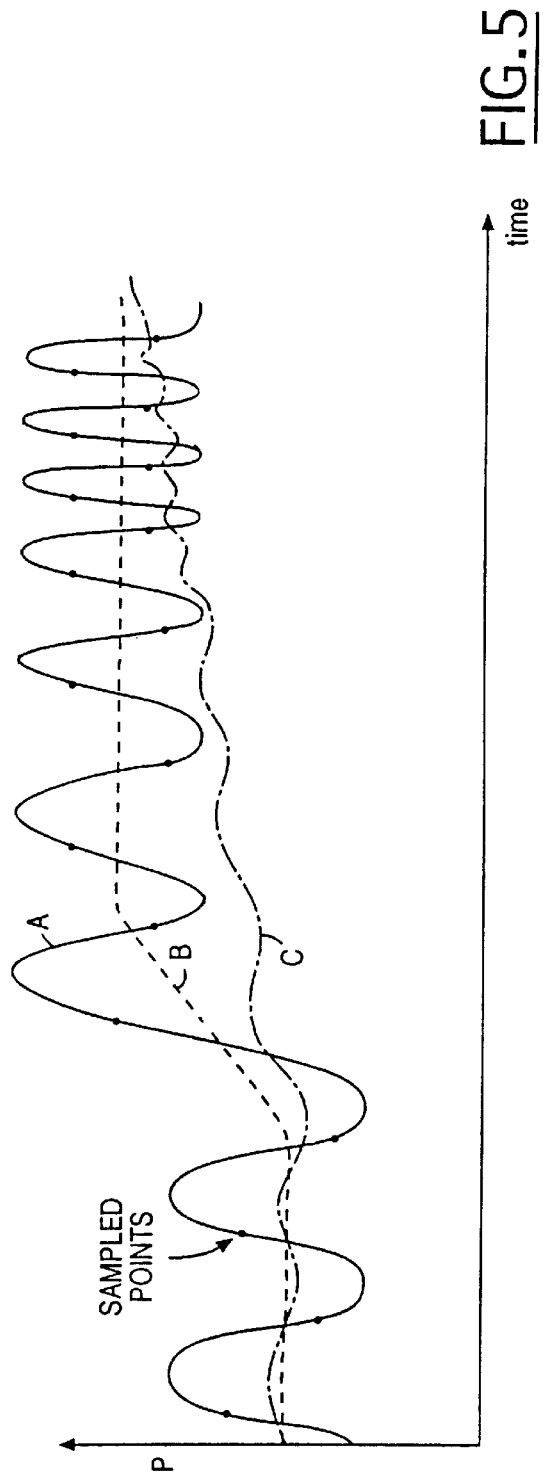

An example of synchronously sampling a waveform is now described with particular reference to the plot shown in FIG. 5. A fluctuating pressure signal, shown by the solid line and labeled A, is sampled with a frequency equal to twice the frequency of the actual signal. The sampled values are shown by points. The reconstructed waveform based on the synchronously sampled values and the filter previously described herein with particular reference to the function G(z) is shown as the dotted line and labeled B. For comparison, a signal using a conventional low pass filter, which is required for conventional sampling schemes, is shown by a dash dot line and labeled C. In this example, the exhaust gas recirculation estimate formed using the synchronous sampling will yield a more accurate value that will allow for better overall air/fuel ratio control.

Figure 6:
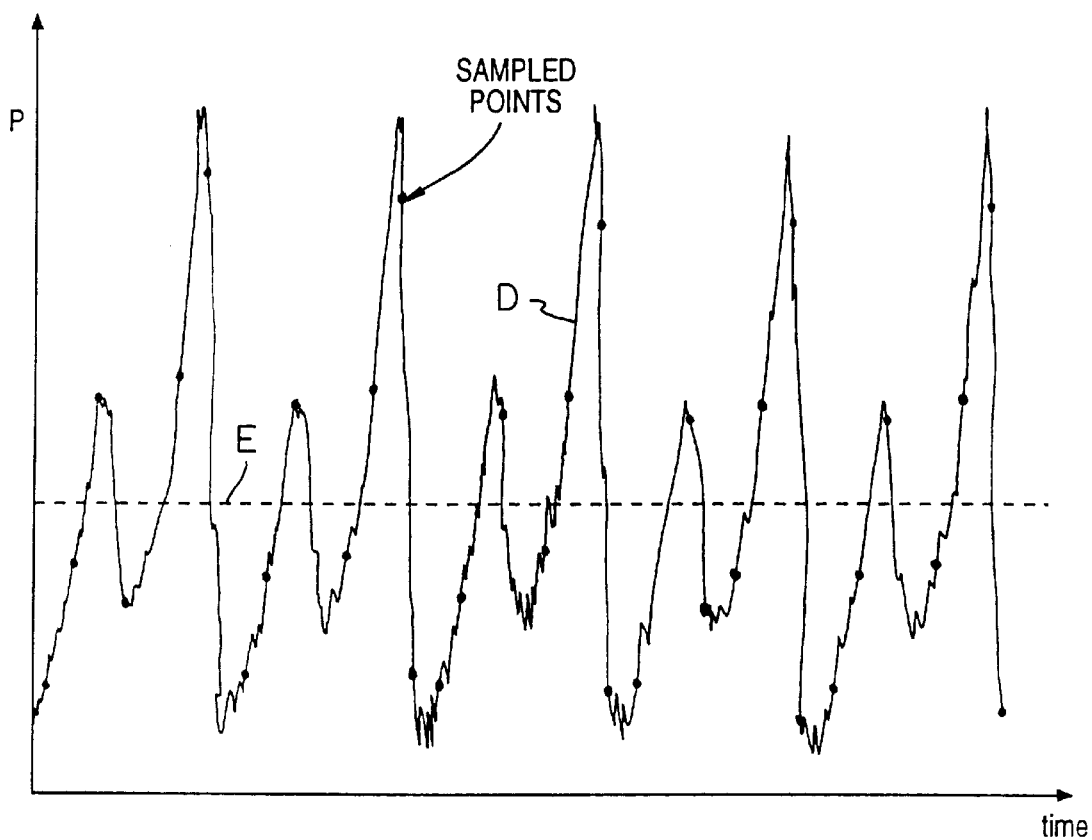

Another example of synchronously sampling a waveform is now described with particular reference to the plot shown in FIG. 6. A fluctuating pressure, shown by the solid line and labeled D, is sampled with a frequency equal to eight times the frequency of the lowest harmonic order. This signal represents a typical exhaust pressure during steady state operating conditions. The sampled values are shown by points. The reconstructed waveform based on the synchronously sampled values and the filter previously described herein with particular reference to the function G'(z) is shown as the dotted line and labeled E. This result could not be obtained unless the sampled values are all perfectly spaced with the rotation of the engine, the synchronous sampling frequency was such that it was twice the highest significant harmonic frequency of the pressure signal, and the appropriate notch filter was used. In this example, the air flow entering the cylinder estimate formed using the synchronous sampling will yield an accurate value that will allow for optimal air/fuel ratio control.

Figure 7A:
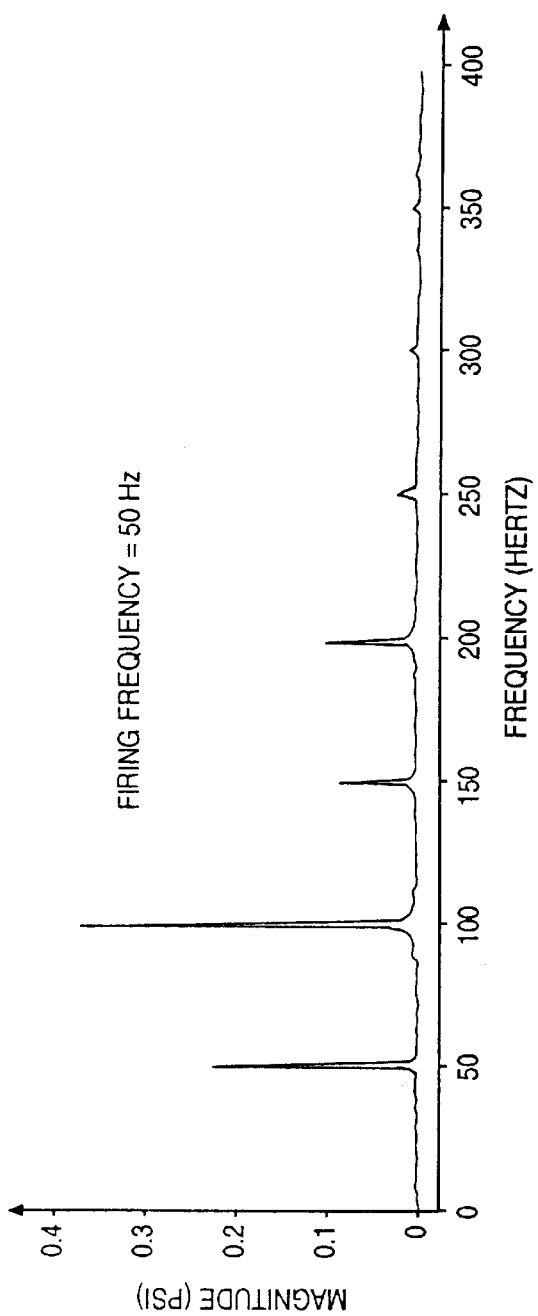
FIGS. 7A and 7B are plots showing frequency content of a pressure signal and an example of a notch filter's magnitude frequency characteristics.
Figure 7B:
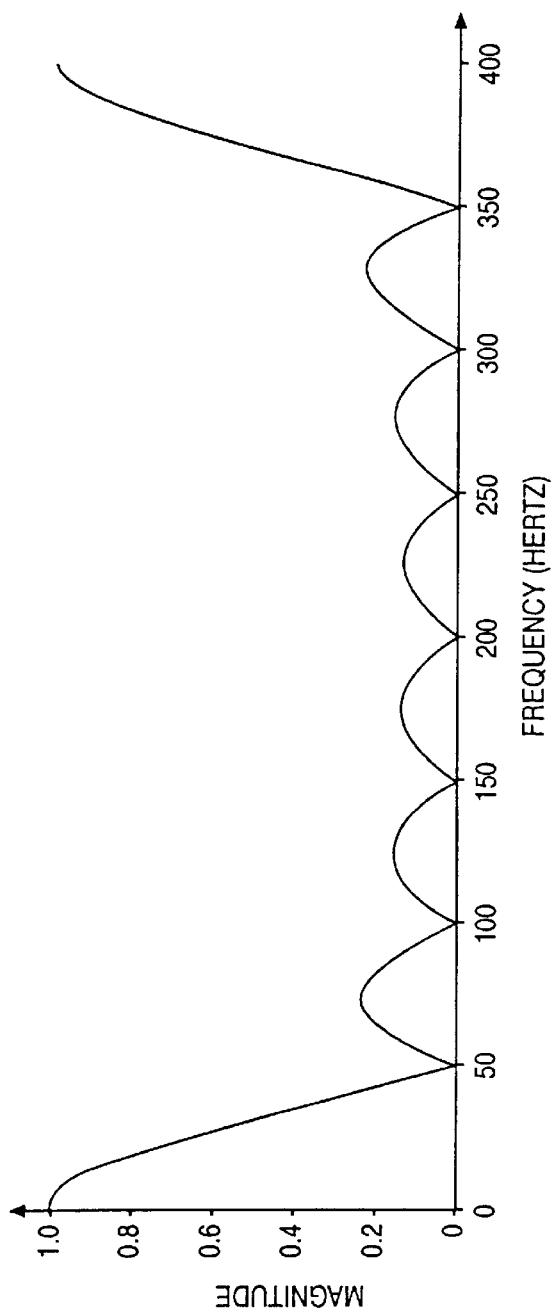

Now referring to FIGS. 7A–7B and in particular to FIG. 7A, the plot shows the frequency content of the pressure waveform shown in FIG. 6. This pressure could represent, for example, the exhaust manifold pressure for a steady state firing frequency of the engine of approximately 50 Hz. FIG. 7B shows a plot of the magnitude versus frequency of the filter G'(z). Thus, the scheme previously described herein with particular reference to FIG. 4, comprises (in the frequency domain) multiplying the plots of FIGS. 7A and 7B. This shows that the mean value, or DC component as known to those skilled in the art, is preserved. The result is a signal substantially free of undesirable frequencies for mean value model computations.

There are also other alternative embodiments of the present invention. For example, using a synchronous sampling scheme is not dependent on the orifice being located downstream of the exhaust gas recirculation flow control valve. The scheme could be employed using a pressure sensor upstream and a pressure sensor downstream of the orifice, with the exhaust gas recirculation flow control valve still between the downstream pressure sensor and the intake manifold, as in current production vehicles. Furthermore, the method is not restricted to flow measurement with an orifice. Other flow measurement techniques known to those skilled in the art could be used with the above described method such as, for example, a venturi, a pitot tube, or a laminar flow element.

While the best mode for carrying out the invention has been described in detail, those skilled in the art in which this invention relates will recognize various alternative designs and embodiments, including those mentioned above, in practicing the invention that has been defined by the following claims.

What is claimed is:

1. A method for calculating air flow in an internal combustion engine, the method comprising:
   sensing an engine speed of the engine;
   obtaining discrete pressure measurements from a continuously measured first pressure at a frequency proportional to a firing frequency of the engine;
   filtering said obtained discrete pressure measurements with a filter to remove oscillations at frequencies proportional to said firing frequency; and
   calculating a mass of gas entering a cylinder of the engine responsive to said filtered discrete pressure measurements and said engine speed.

2. The method recited in claim 1 wherein said first pressure sensor is a manifold pressure sensor.

3. The method recited in claim 1 further comprising the step of determining said frequency from an engine rotation signal.

4. The method recited in claim 1 wherein said step of obtaining discrete pressure measurements further comprises the step of obtaining discrete pressure measurements from a continuously measured first pressure at said first frequency substantially proportional to a dominant frequency of said first pressure measured by said first pressure sensor.

5. The method recited in claim 4 wherein said step of calculating further comprises the steps of:
   suspending said calculation during a transition in a flow area; and
   creating an open-loop estimate of said mass of gas responsive to said transition and engine operating conditions.

6. The method recited in claim 1 further comprising the steps of:
   obtaining second discrete pressure measurements from a continuously measured second pressure at a second frequency proportional to said firing frequency of the engine;
   calculating a gas flow estimate responsive to a difference between said discrete pressure measurements and said second discrete pressure measurements.

7. The method recited in claim 6 wherein said second pressure sensor is an exhaust pressure sensor.

8. The method recited in claim 6 further comprising the step of determining said second frequency from an engine rotation signal.

9. The method recited in claim 6 wherein said gas flow is an exhaust gas recirculation flow.

10. The method recited in claim 6 wherein said step of obtaining second discrete pressure measurements further comprises the step of obtaining second discrete pressure measurements from a continuously measured second pressure at said second frequency substantially proportional to a dominant frequency of said second pressure measured by said second pressure sensor.

11. A method for calculating exhaust gas recirculation of an internal combustion engine having an exhaust gas recirculation tube coupled between an intake manifold and an exhaust manifold, an orifice in the tube, a first pressure sensor located upstream of the orifice, and a second pressure sensor located downstream of the orifice, said method comprising:
   obtaining first discrete pressure measurements from a continuously measured first pressure of the first sensor at a first frequency proportional to a firing frequency of the engine;
   obtaining second discrete pressure measurements from a continuously measured second pressure of the second pressure sensor at a second frequency proportional to said firing frequency of the engine; and
   calculating an exhaust gas recirculation flow responsive to a difference between said obtained first discrete pressure measurements and said obtained second discrete pressure measurements.

12. The method recited in claim 11 further comprising the steps of:
   filtering said obtained first discrete pressure measurements with a first filter to remove oscillations at frequencies proportional to said firing frequency;
   filtering said obtained second discrete pressure measurements with a second filter to remove oscillations at frequencies proportional to said firing frequency; and
   calculating said exhaust gas recirculation flow responsive to a difference between said obtained first filtered pressure and said obtained second filtered pressure.

13. The method recited in claim 11 further comprising the step of determining said first freqeucny and said second frequency from an engine rotation signal.

14. The method recited in claim 11 wherein said step of obtaining first discrete pressure measurements further comprises the step of obtaining first discrete pressure measurements from a continuously measured first pressure of the first sensor at said first frequency substantially proportional to a first dominant frequency of said first pressure measured by the first pressure sensor.

15. The method recited in claim 11 wherein said step of obtaining second discrete pressure measurements further comprises the step of obtaining second discrete pressure measurements from a continuously measured second pressure of the second sensor at said second frequency substantially equal to a second dominant frequency of said second pressure measured by the second pressure sensor.

* * * * *